(12) United States Patent
Lu

(10) Patent No.: US 6,981,065 B1
(45) Date of Patent: Dec. 27, 2005

(54) PROVISIONING OF CONNECTION THROUGH A SONET/SDH NETWORK

(75) Inventor: Xiang Lu, Bishops Stortford (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/573,239

(22) Filed: May 18, 2000

(51) Int. Cl.[7] .................. G06F 15/16; G06F 15/173; H04L 12/28
(52) U.S. Cl. .................. 709/251; 709/223; 370/258
(58) Field of Search .................. 359/124, 123; 345/735, 734; 709/224, 223, 226, 251; 370/389, 370/532, 258, 351, 401

(56) References Cited

U.S. PATENT DOCUMENTS

| | | | | |
|---|---|---|---|---|
| 6,023,733 | A | | 2/2000 | Periasamy .................. 709/241 |
| 6,052,722 | A | * | 4/2000 | Taghadoss .................. 709/223 |
| 6,111,673 | A | * | 8/2000 | Chang et al. .............. 359/123 |
| 6,160,651 | A | * | 12/2000 | Chang et al. .............. 359/124 |
| 6,229,538 | B1 | * | 5/2001 | McIntyre et al. ........... 345/734 |
| 6,229,540 | B1 | * | 5/2001 | Tonelli et al. .............. 345/735 |
| 6,271,946 | B1 | * | 8/2001 | Chang et al. .............. 359/124 |
| 6,347,336 | B1 | * | 2/2002 | Song et al. ................. 709/223 |
| 6,496,862 | B1 | * | 12/2002 | Akatsu et al. .............. 709/224 |
| 6,523,064 | B1 | * | 2/2003 | Akatsu et al. .............. 709/226 |
| 6,556,593 | B1 | * | 4/2003 | Herkersdorf et al. ....... 370/532 |
| 6,643,286 | B1 | * | 11/2003 | Kapadia et al. ............ 370/389 |

* cited by examiner

Primary Examiner—William A Cuchlinski, Jr.
Assistant Examiner—Michael Delgado
(74) Attorney, Agent, or Firm—Barnes & Thornburg

(57) ABSTRACT

A method of provisioning a connection across a SONET/SDU network formed from multiple sub-networks comprises: determining a model of the entire network, the model indicating the connections between all sub-networks, and representing each sub-network as a single unit; calculating a route between the sub-networks containing the first and second nodes using the model; passing the signals along the determined route, and determining the route between nodes within each sub-network locally within the respective sub-network. This method enables a simplified model of the network to be stored in each node of the network, so that a route calculation can take place at the sending node. The specific route through the network is determined as the signal passes through the network, as the specific path through individual sub-networks is determined locally. Thus, each node only needs to be capable of calculating a general route using the simplified model of the whole network and also capable of calculating a specific route through the sub-network of the node itself.

12 Claims, 4 Drawing Sheets

PROVISIONING OF CONNECTION THROUGH A SONET/SDH NETWORK

BACKGROUND OF THE INVENTION

This invention relates to the provisioning of connection through a transmission network, and in particular through a SONET/SDH network formed from multiple sub-networks.

Networks provide a mechanism for exchanging data between various nodes in the network and between devices coupled to the network. Various types of protocols may be used for propagating data through a single network or through multiple interconnected networks. A connection-oriented protocol is an example of a network protocol which establishes a connection between a source and a destination and transfers data along the established connection. The established connection typically includes a series of links through intermediate nodes in the network. Once the connection has been established, all data for a particular data flow travels across the same path. Asynchronous Transfer Mode (ATM), Internet Stream Protocol, Frame Relay and SONET/SDH are examples of connection-oriented protocols.

Most networks are organized as a series of hardware and software layers within each station. These layers interact to format data for transfer between the source and destination communicating over the network. Specifically, predetermined services are performed on the data as it passes through each layer and the layers communicate with each other by means of the predefined protocols. This layered design permits each layer to offer selected services to other layers using a standardized interface that shields the other layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The OSI model has seven layers which are termed, in ascending interfacing order, the physical, data link, network, transport, session, presentation, and application layers. These layers are arranged to form a "protocol stack" in each station of the network.

FIG. 1 illustrates a schematic block diagram of conventional protocol stacks 125 and 175 used to transmit data between a source station 110 and a destination station 150, respectively, of a network 100. Each protocol stack comprises a collection of protocols, one per layer, and is preferably structured according to the OSI seven-layer model. As can be seen, the protocol stacks 125 and 175 are physically connected through a communications channel 180 at the physical layers 124 and 164. For ease of description, the protocol stack 125 will be described.

In general, the application layer 112 contains a variety of protocol functions that are commonly needed by software processes, while the presentation layer 114 is responsible for the presentation of transmitted data in a meaningful manner to the application layer. The session layer 116, transport layer 118 and the network layer 120 are substantially involved in is providing pre-defined sets of services to aid in connecting the source station to the destination station.

The physical layer 124 is concerned with the actual transmission of signals across the communication channel. The data link layer 122, on the other hand, is responsible for transmission of data from one station to another. This invention is concerned specifically with communication over a SONET/SDH network, The SONET/SDH frame structure is defined at the physical layer of the seven layer model.

Data transmission over the network 100 consists of generating data in a sending process 104 of the source station 110, passing that data to the application layer 112 and down through the layers of the protocol stack 125, where the data are sequentially formatted as a frame for delivery onto the channel 180 as bits. Those frame bits are then transmitted to the protocol stack 175 of the destination station 150, where they are passed up that stack to a receiving process 174. Data flow is schematically illustrated by solid arrows.

Although actual data transmission occurs vertically through the stacks, each layer is programmed as though such transmission were horizontal. That is, each layer in the source station 100 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as frame propagates up the layers of stack 175 until it arrives at the receiving process.

A significant function of each layer in the OSI model is to provide services to the other layers. One type of service offered by the layers is a "connectionless" transmission service where each transmitted packet carries the full address of its destination through the network. A key function of a routing device such as a bridge or a router is determining the next sub-network or node to which the packet is sent. A bridge operates at the data-link level, connecting one or more networks (for example LANs) together (that is, facilitating the transfer of messages among the LANs connected to the bridge). A router operates at the network level and may span clusters of LANs. When the network layer receives a packet from the transport layer for transmission over the network, it encapsulates the packet with a header containing, inter alia, source and destination addresses. An example of a network layer protocol is the Internet Protocol.

This invention is concerned with the end-to-end provisioning of connections in the SONET/SDH physical layer. This process is normally performed manually by a network planner and is labour and time intensive.

This invention relates to a method of establishing a connection in a connection-oriented transport network, by using a routing protocol to identify the sole or optimal path over which the data is to travel. The nodes then use this routing protocol between one another to calculate routes between them.

A common routing protocol is a link state routing protocol. In a link state routing protocol, each node in the network (for example, a router) maintains information about each link in the network. A topology state routing protocol is a refinement of link state protocol in which significant status about the internal structure or operation of other nodes in the network may be maintained in addition to information about links. Conventional routing protocols operate at the network layer.

Once the source station has determined the path to the destination, it caches the path for future use, and then transmits frames specifying the path and the address of the destination station onto the network.

In one common route-discovery procedure, the source station issues the frame as an "all-paths explorer" packet that is received by each station on the local sub-networks. Each routing device copies the frame and supplies information relating to the route and then distributes the copy to all interconnected nodes. Eventually, a copy of the broadcast explorer frame reaches every station on every sub-network of the network. Each station may respond to the source by issuing a response frame containing its address and the routing information. The source station examines the information contained in these response frames and selects (e.g., based on the round-trip time for return) a path to the intended destination. Routing devices along the path may also cache the path to the destination station.

When multiple sub-networks are connected together, and a route is required which spans across several sub-networks, the routing procedure becomes more computationally intensive. SONET/SDH networks are an example, in which different sub-network layers operate at different data rates. These sub-networks comprise Long Haul networks, Regional networks and Metro networks, and connections have to be established crossing network boundaries. These connections are made using the tributaries of the network nodes in one sub-network to connect to a network node with a lower line rate.

Conventionally, the provisioning within a SONET/SDH multi-layer network has been carried out by an essentially manual process at each of the sub-networks to be connected. This is labour and time consuming. An efficient routing procedure is therefore required capable of crossing network boundaries and capable of route determination through sub-networks. SONET/SDH is also a synchronous system, and a limited bandwidth is available for signalling purposes, in the form of allocated bits in each data frame. A routing procedure is therefore required which can be implemented using the available bandwidth for signalling in the existing SONET/SDH data communication channel.

SUMMARY OF THE INVENTION

According to a first aspect of the invention, there is provided a method of provisioning a connection across a SONET/SDH network between first and second network nodes, the network comprising at least a top level network and one or more levels of sub-networks, with sub-networks in the levels being coupled to sub-networks in adjacent levels by shared network nodes, the method comprising:

determining a model of the entire network, the model indicating the connections between all sub-networks, and representing each sub-network as a single unit;

calculating a route between the sub-networks containing the first and second nodes using the model;

passing the signals along the determined route, and determining the route between nodes within each sub-network locally within the respective sub-network.

The method of the invention enables a simplified model of the network to be stored in each node of the network, so that a route calculation can take place at the sending node. The specific route through the network is determined as the signal passes through the network, as the specific path through individual sub-networks is determined locally. Thus, each node only needs to be capable of calculating a general route using the simplified model of the whole network and also capable of calculating a specific route through the sub-network of the node itself.

The model of the entire network may be obtained using the steps of, starting with the sub-networks in the lowest level:

(i) using the shared network node between each first sub-network in the lowest level and a connected second sub-network in a level nearer to the top level to pass information from the first sub-network to the second sub-network, the information indicating to the second sub-network that there is a subtending lower level sub-network from the shared node;

(ii) using the shared network node between each second sub-network and a connected third sub-network in a level nearer to the top level to pass information from the second sub-network to the third sub-network, the information indicating to the third sub-network that there is a subtending sub-network from the shared node and indicating any sub-networks subtending from the second sub-network;

(iii) repeating step (ii) until the top level has a tree model indicating the connection of all sub-networks within the network; and (iv) distributing the tree model to all nodes in the network using the shared nodes by passing information down through the sub-networks.

This process for obtaining the overall network model relies upon the distribution of signals up and down the levels of the sub-networks, and thereby produces an up-to-date model of the network. As the model is a simplified network representation, the signalling required to pass the information around the network is reduced. Each sub-network then determines its own topology using a routing protocol within the respective sub-network.

Preferably, the signals are passed along the determined route with a routing label, the routing label comprising a stack having a level for providing routing information for each network level along the route. In this way, the sub-networks amend only one level of the routing label. For example, the provisioning information in a level of the label stack may be determined using a Label Distribution Protocol. The label may be communicated through he SONET/SDH datacomm channels.

According to a second aspect of the invention, there is provided a computer-readable medium embodying executable instructions for use in defining a route between first and second network nodes in a SONET/SDH network, the network comprising at least a top level network and one or more levels of sub-networks, with sub-networks in the levels being coupled to sub-networks in adjacent levels by shared network nodes, the instructions causing generation of a data structure defining the network, the data structure comprising a model of the entire network, the model indicating the connections between all sub-networks, and representing each sub-network as a single unit, the instructions further causing calculation of a route between the sub-networks containing the first and second nodes using the model; and the instructions further resulting in generation of a label for attachment to a signal for transmission, the label defining the determined route.

This medium may be provided at each network node, so that routing calculations can be carried out by any node receiving a signal for transmission. For the medium associated with a node of an individual sub-network level of the network, the instructions further enable determination of a route between nodes within that sub-network. Thus, each node can perform the general routing calculations through the network, and each node can additionally perform specific routing calculations through the sub-network which includes that particular node.

According to a third aspect of the invention, there is provided a SONET/SDH network comprising at least a top level network and one or more levels of sub-networks, with sub-networks in the levels being coupled to sub-networks in adjacent levels by shared network nodes, the network nodes each storing a model of the entire network, the model indicating the connections between all sub-networks, and representing each sub-network as a single unit, each node further comprising means for calculating a route between the sub-networks containing the first and second nodes using the model, and wherein each node is provided within a respective sub-network of the network and further comprises means for determining a route between nodes within said sub-network locally within the respective sub-network.

BRIEF DESCRIPTION OF THE DRAWINGS

Examples of the invention will now be described in detail with reference to the accompanying drawings, in which.

DETAILED DESCRIPTION

Figure 1:
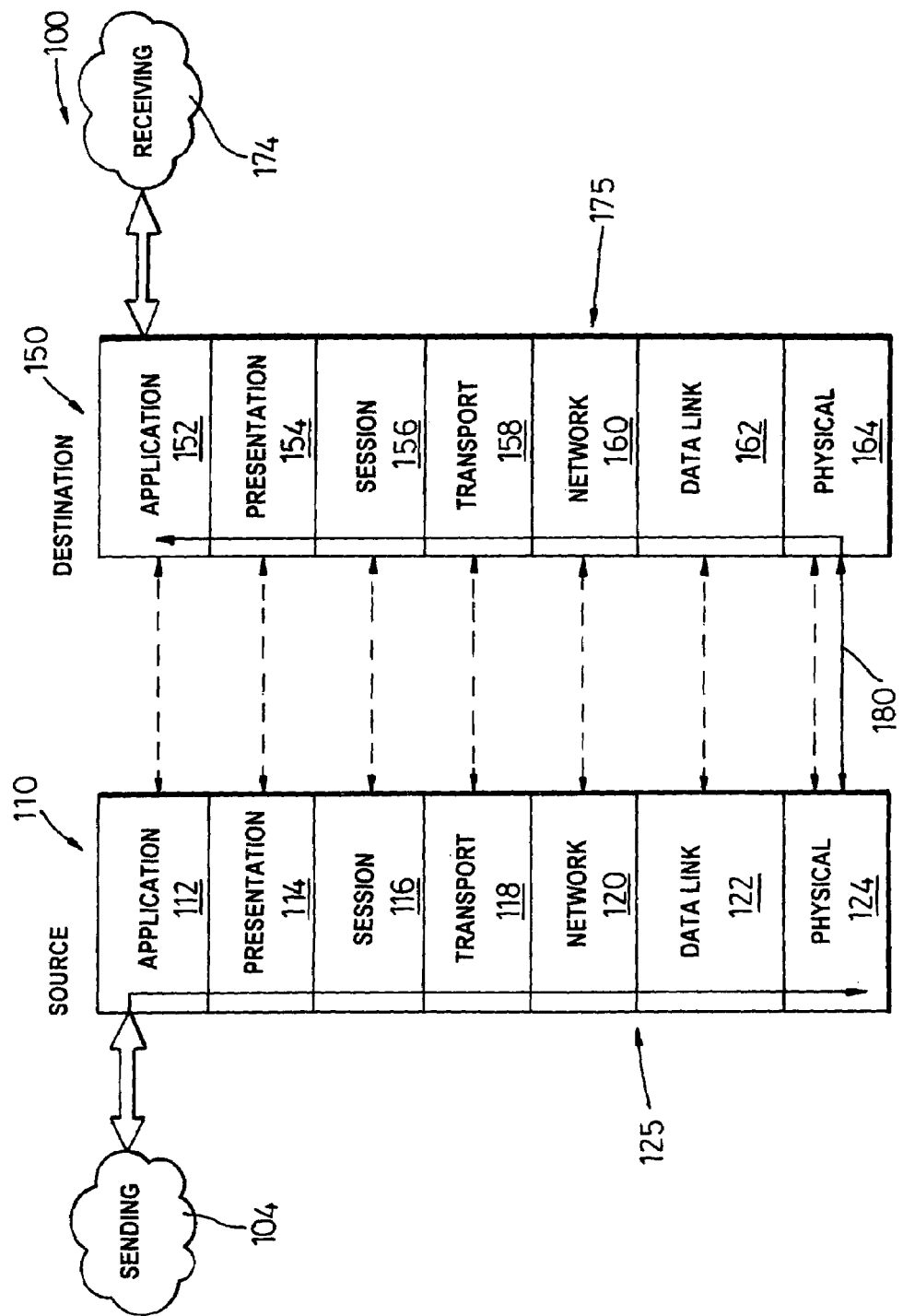
FIG. 1 shows how protocol stacks are used to transmit data between a source and a destination of a computer network.
Figure 2:
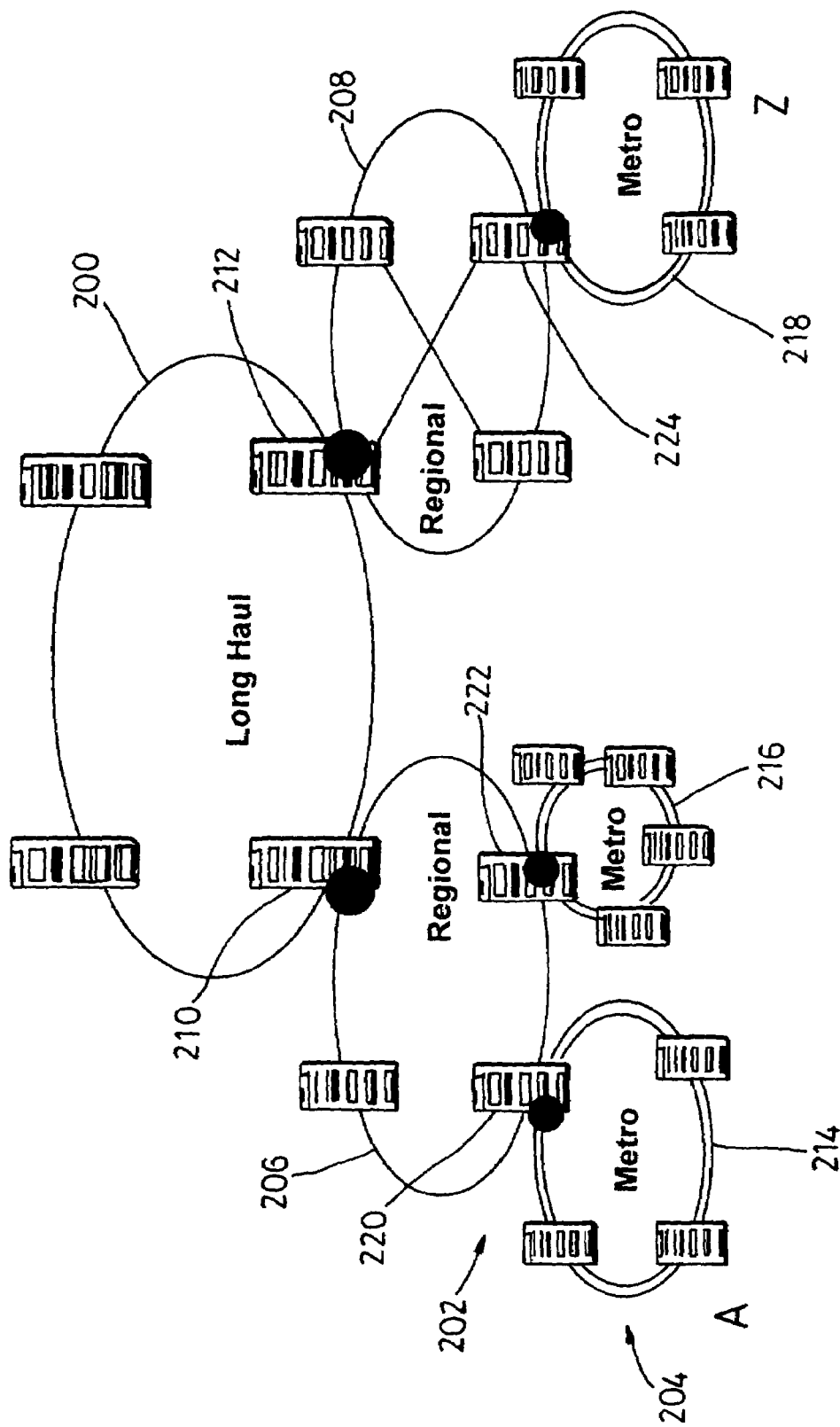
FIG. 2 shows a multi level SONET/SDH network in which routing can be determined in accordance with the invention.

FIG. 2 shows a SONET/SDH multi-level network which can benefit from the provisioning procedure of the invention. The network comprises a top level sub-network 200 and two levels 202,204 of further sub-networks. The sub-networks 206,208 in the level 202 are coupled to the top level sub-networks 200 by shared network nodes 210, 212. The sub-networks 206,208 are connected to the tributary shelves in the nodes 210,212 shared between the top level sub-network 200 and the sub-networks in the level 202. In a similar fashion, the sub-networks 214,216,218 in the level 204 are coupled to the sub-networks in level 202 by shared network nodes 220, 222, 224. The sub-networks 214,216, 218 are connected to the tributary shelves in the nodes 220,222,224.

The top level network 200 comprises a long haul backbone network, for example a SONET/SDH OC-192 network, The sub-networks in the first level 202 comprise regional SONET/SDH OC-48 networks, and the sub-networks in the second level 204 comprise metro SONET/SDH OC-12 networks. There may additionally be subtending access SONET/SDH OC-3 networks. Thus, the network comprises different levels operating at different line rates.

FIG. 2 shows two nodes A and Z in different sub-networks of the lowest level 204, and the invention will be described for the example of provisioning a connection from node A to node Z. Thus, data is provided at node A, and that node is required to implement an automatic provisioning protocol to enable transmission to node Z.

Figure 3:
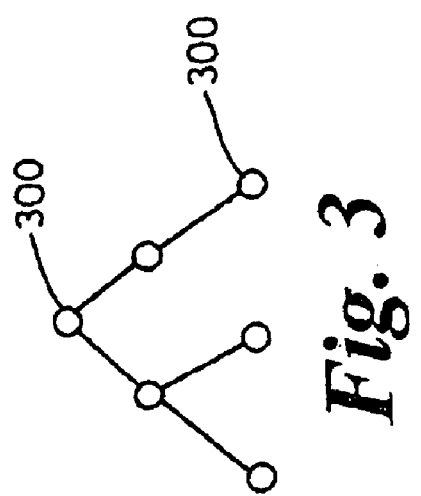
FIG. 3 shows a simplified model of the network of FIG. 2.

The routing protocol of the invention initially performs an auto-discovery of the network topology. In particular, a model of the entire network is determined, the model indicating the connections between all sub-networks, and representing each sub-network as a single unit. The model is represented in FIG. 3, in which each node 300 of the model represents one of the sub-networks of FIG. 2.

This model is stored in each node of the network, and may be updated periodically and/or specifically in response to a request for provisioning a connection between nodes. In order to create or update the model, the following steps are carried out.

The sub-networks in the lowest level pass information to the connected sub-networks in the next level up through the shared nodes. For example, sub-network 214 passes information via the tributary shelf of node 220 to the sub-network 206. This information indicates that there is a sub-network subtending from the node 220. The SONET/SDH architecture provides separate traffic and signalling bandwidth in the frame structure. In particular, the frame structure includes so-called line and section datacomm channels (LDCC, SDCC), and the bandwidth provided by these channels is used for signalling purposes in the present invention.

The shared network nodes for the next level up are then used to pass information further up the network levels. Thus, information passes from the level 202 to the top level 200. This information indicates that that there is a subtending sub-network from the shared node and also indicates any further sub-networks subtending lower down. Thus, a tree structure is advanced up the network levels to the top level, and by this recursive process, a tree model of the entire network is formed. This full tree is initially obtained at the top level, but is propagated to all the network nodes through the tributaries, so that each node stores the up-to-date simplified model of the network.

When a request for establishing a connection is received at a node, for example node A, the node runs a simplified Label Distribution Protocol (LDP), for example Constraint-Routed LDP, to calculate automatically the route to the destination node, Z, based on the network model stored in the node. The route calculated in the node is a path through the tree structure illustrated in FIG. 3, and does not therefore provide the complete node-to-node path of the data. The route may take into account constraints set at the sending node, for example relating to protection. For example, the connection may be provisioned with 1+1 dedicated protection, or with shared protection.

The specific passage of data within a sub-network is determined locally, and for this purpose, each sub-network will auto discover its own topology, for example using an Open Shortcut Path First (OSPF) based protocol. This can be carried using the SONET/SDR DCC channels. At the end of the auto-discovery process, local sub-network topologies are available to all nodes within those sub-networks.

When passing information through the calculated route, a label is used for each sub-network, and these labels are stacked as they travel through the different sub-networks. The data travels based on the layer of the label relating to that particular sub-network level. When data is travelling down the tree, layers of the label are removed as the data approaches the destination, whereas layers of the label are added as the data travels towards the higher data rate top layer.

Figure 4:
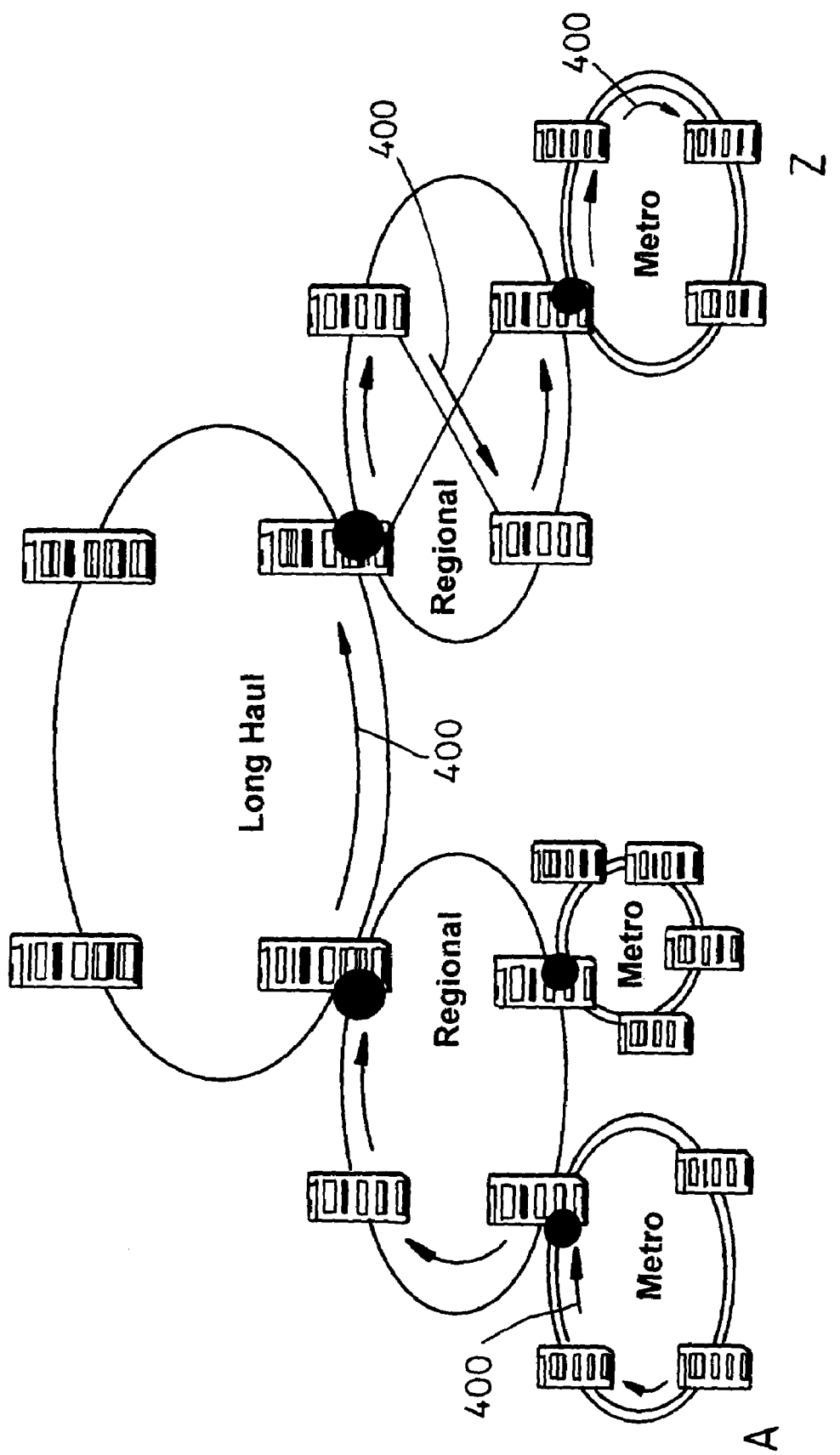
FIG. 4 shows a connection through the network between nodes A and Z and is used to explain the routing method of the invention.

FIG. 4 shows one possible path 400 from node A to Z established using the invention. The path is effectively a label switched path, and the invention is implementing a modified Multiprotocol Label Switching (MPLS) technique in a SONET/SDH network.

A multi-level SONET/SDH network may be connected together using matched node connections. With appropriate label definitions, the invention may also be applied to networks having matched-node connections.

The provisioning of a connection may be inhibited during line protection switching.

The provisioning method of the invention provides distributed intelligence of the network topology so that the bandwidth required for signalling during route calculation is reduced. Automatic and autonomous end-to-end provisioning is provided.

Nodes for use in networks of the invention require memory for storing the model of the entire network and require processing power for calculating a route between the sub-networks and for determining the local topology of the sub-network. The method of route determination will in practice be implemented as a computer program.

Various modifications will be apparent to those skilled in the art. There are various processes for route determination across the network, and various alternative techniques for determining the topology locally of the sub-networks. These possibilities are all intended to fall within the scope of the attached claims.

What is claimed is:

1. A method of provisioning a connection across a SONET/SDH network between first and second network nodes, the network comprising at least a top level sub-network and one or more further levels of sub-networks, at least one of the further levels comprising two or more separate sub-networks, and each of the sub-networks comprising two or more network nodes, with sub-networks in the levels being coupled to sub-networks in adjacent levels by shared network nodes, the first and second nodes not being part of the same sub-network, the method comprising:
   determining a model of the entire network, the model indicating the connections between all sub-networks, and representing each sub-network as a single unit;
   calculating a route between the sub-networks containing the first and second nodes using the model; and
   passing the signals along the determined route, and determining the route between nodes within each sub-network locally within the respective sub-network.

2. A method as claimed in claim 1, wherein the model of the entire network is obtained using the steps of, starting with the sub-networks in the lowest level:
   (i) using the shared network node been each first sub-network in the lowest level and a connected second sub-network in a level nearer to the top level to pass information from the first sub-network to the second sub-network, the information indicating to the second sub-network that there is a subtending lower level sub-network from the shared node;
   (ii) using the shared network node between each second sub-network and a connected third sub-network in a level nearer to the top level to pass information from the second sub-network to the third sub-network, the information indicating to the third sub-network that there is a subtending sub-network from the shared node and indicating any sub-networks subtending from the second sub-network;
   (iii) repeating step (ii) until the top level has a tree model indicating the connection of all sub-networks within the network; and
   (iv) distributing the tree model to all nodes in the network using the shared nodes by passing information down through the levels.

3. A method as claimed in claim 1, wherein each sub-network determines its own topology using a routing protocol within each sub-network.

4. A method as claimed in claim 1, wherein the signals are passed along the determined route with a routing label, the routing label comprising a stack having a level for providing routing information for each network level along the route.

5. A method as claimed in claim 4, wherein the routing information in a level of the label stack is determined using a Label Distribution Protocol.

6. A method as claimed in claim 4, wherein a level of the label stack is added or removed when the signal passes from one sub-network level to another sub-network level.

7. A method as claimed in claim 4, wherein the label is communicated through the SONET/SDH datacomm channels.

8. A computer-readable medium embodying executable instructions for use in defining a route between first and second network nodes in a SONET/SDH network, the network comprising at least a top level sub-network and one or more further levels of sub-networks, at least one of the further levels comprising two or more separate sub-networks, and each of the sub-networks comprising two or more network nodes, with sub-networks in the levels being coupled to sub-networks in adjacent levels by shared network nodes, the first and second nodes not being part of the same sub-network, the instructions causing generation of a data structure defining the network, the data structure comprising a model of the entire network, the model indicating the connections between all sub-networks, and representing each sub-network as a singe unit, the instructions further causing calculation of a route between the sub-networks containing the first and second nodes using the model; and the instructions further resulting in generation of a label for attachment to a signal for transmission, the label defining the determined route.

9. A computer readable medium as claimed in claim 8 associated with a node of an individual sub-network level of the network, wherein the instructions further enable determination of a route between nodes within the sub-network.

10. A computer readable medium as claimed in claim 9 associated with the nodes of an individual sub-network level of the network, wherein the instructions further enable modification of an exiting label to add or remove a portion of the label providing information relating to a route between nodes within the sub-network.

11. A SONET/SDH network comprising at least a top level sub-network and one or more further levels of sub-networks, at least one of the further levels comprising two or more separate sub-networks, and each of the sub-networks comprising two or more networks nodes, with sub-networks in the levels being coupled to sub-networks in adjacent levels by shared network nodes, the network nodes each storing a model of the entire network, the model indicating the connections between all sub-networks, and representing each sub-network as a single unit, each node further comprising means for calculating a route between sub-networks containing first and second nodes using the model, the first and second nodes not being part of the same sub-network, and wherein each node is provided within a respective sub-network of the network and further comprises means for determining a route between nodes within said sub-network locally within the respective sub-networks.

12. A SONET/SDH network as claimed in claim 11, wherein each node further comprises means for generating a level of a stacked routing label, the level of the routing label providing routing information within said sub-network.

* * * * *